United States Patent Office 2,715,929
Patented Aug. 23, 1955

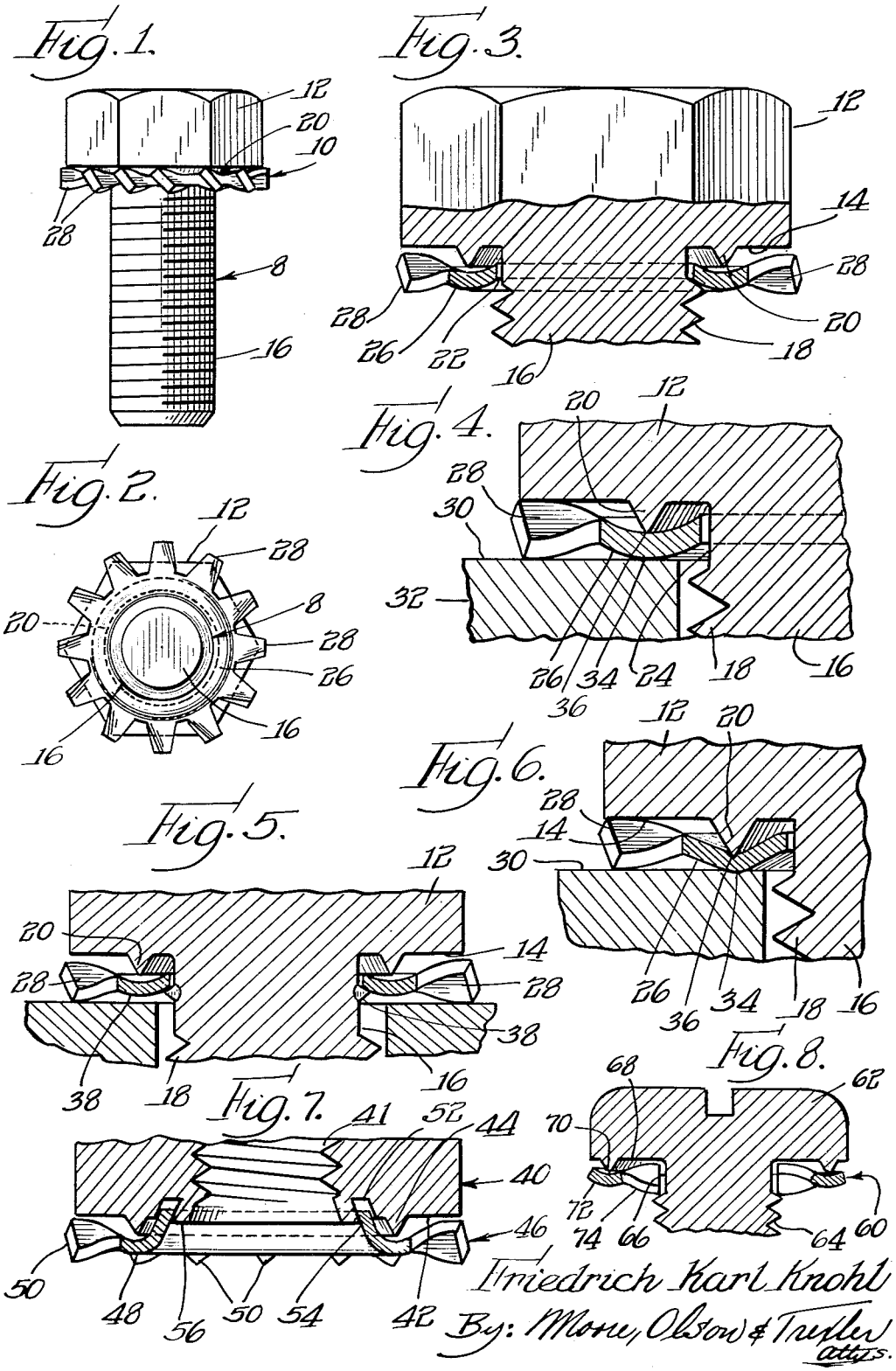

2,715,929

ROTARY FASTENER AND SEALING LOCK WASHER ASSEMBLY

Friedrich Karl Knohl, Roselle, Ill., assignor to Illinois Tool Works, Chicago, Ill., a corporation of Illinois Application May 24, 1952, Serial No. 289,723

5 Claims. (Cl. 151—37)

The present invention relates to rotary fastener units, and more particularly to rotary fasteners such as screws or nuts having locking and sealing washers assembled therewith.

When using lock washers of the deflected tooth type, it has been found that when the rotary fastener such as a screw or nut is tightened sufficiently to completely flatten the teeth of a washer, the washer tends to lose some of its locking efficiency, since the edges of the teeth no longer dig into the clamping surface of the fastener. It is, therefore, an object of the present invention to provide a rotary fastener unit having a deflected tooth type lock washer in which when the unit is securely fastened to the work, the teeth of the washer remain at least partially deflected whereby their full locking efficiency is maintained.

Rotary fastener units of the above described type are often used where it is necessary to provide a seal between the clamping surface of the fastener and the work surface. For example, when such a fastener unit is used to assemble the parts of a liquid container, a seal must be provided for preventing liquid from escaping through the threaded aperture provided for a screw or stud. It is, therefore, another object of this invention to construct a rotary fastener unit so as to provide an effective seal between the clamping surface of the fastener and the work surface around the threaded aperture therein.

Other objects and advantages of the present invention will be apparent from the following description and from the drawings wherein:

Fig. 1 is a side elevational view of one form of a fastener unit involving the present invention;

Fig. 2 is a bottom view of the device shown in Fig. 1;

Fig. 3 is an enlarged side elevational view of the device shown in Fig. 1 with the lower portion broken away to illustrate more clearly the novel features thereof;

Fig. 4 is an enlarged fragmentary view similar to Fig. 3, showing the device in cooperative relationship with a work piece;

Fig. 5 is a view similar to Fig. 3, showing a modified form;

Fig. 6 is a view similar to Fig. 4, showing a modified form of the device;

Fig. 7 is a view similar to Fig. 3, but showing the novel features of my invention applied to a rotary nut fastener instead of a screw fastener; and Fig. 8 is a view similar to Fig. 3, but showing still another modified form of this invention.

Referring now to the drawings wherein like parts in the several figures are designated by the same numeral, the rotary fastener unit as shown in Figs. 1 through 6, inclusive, comprises a screw 8 and a lock washer 10.

The screw 8 comprises a head 12 having a clamping surface 14 and a shank 16 having threads 18 which are preferably rolled thereon. An annular protuberance 20 extends axially from the clamping surface 14 of the head 12. The annular protuberance preferably is formed so that it tapers from a relatively broad base to a relatively narrow free outer edge, or, in other words, it is of V-shaped cross section.

The lock washer 10 is provided with a central aperture 22 through which the shank 16 extends. The aperture 22 has a diameter which is preferably only slightly larger than the diameter of the unthreaded portion 24 of the shank 16. The outer diameter of the screw threads 18 is greater than the diameter of the aperture 22 whereby the washer 10 is retained in assembled relationship with the screw 8 by the engagement of the inner margin of the washer with the adjacent convolution screw threads 18. The washer 10 has an annular body 26 which has the mid portion thereof displaced or arched axially away from the clamping surface 14 of the head 12. In the form shown in Figs. 3, 4, and 5, the annular body 26 is of concavo-convex shape in radial cross section. In the embodiment shown in Fig. 6, the annular body portion 26 is V-shaped in cross section. In both embodiments, the convex side provides an annular sealing surface of limited area. Locking prongs 28 extend radially outwardly from the body 26. The prongs 28 are twisted or deflected axially so as to present opposite edges or teeth beyond the bounding planes of the body 26 for locking engagement with the clamping surface 14 of the head 12 on one side and the work surface 30 of the work piece 32 on the other side.

When the rotary fastener is applied to a work piece, as shown in Figs. 4 and 6, the annular protuberance 20 engages the annular body 26 of the washer 10 and forces the opposite surface thereof into sealing contact with the work surface 30. Because of the relatively narrow circular surface area to which this clamping force is applied, an effective seal is formed between the annular sealing surface of the washer 10 and the work surface 30 as at 34, and a second seal is formed between the outer end of the protuberance 20 and the upper concave surface of the washer 10 as at 36. Preferably, the washer 10 is formed from sheet metal, and, hence, the annular body 26 thereof may flex under the clamping pressure of the fastener 8 to conform with any irregularities in the work surface 30. This insures an effective seal in spite of small imperfections in the work surface.

The annular protuberance 20 acts not only as a means for concentrating the sealing pressure to a relatively narrow area, but it also acts as a spacer to space the clamping surface 14 of the head 12 above the upper surface of the washer 10. Because of this structure, when the screw 8 is securely tightened to the work piece, the deflected prongs cannot be completely flattened, and therefore, when the fastener unit is finally tightened, effective locking action of the tooth edges to the clamping surface 14 and the work surface 30 is assured. Preferably, the axial length of the annular protuberance 20 is such that the teeth 28 will be subjected to partial untwisting with said teeth being constantly urged into locking engagement with the screw head and work.

The embodiment shown in Fig. 5 is identical to that shown in Fig. 3, except that protuberances or lugs 38 are formed integrally with and extruded from the shank 16 to retain the washer 10 in assembled relationship with the screw 8. Preferably, at least three of the protuberances 38 are provided and spaced equally around the periphery of the shank in order to prevent the washer 10 from tilting relative to the shank 16. This enables the application of the invention in instances where an unthreaded shank portion of substantial axial extent is present adjacent the screw head.

Fig. 7 illustrates the principles of my invention as they are applied to a nut 40. The nut 40 is provided with a threaded bore 41 which is adapted to cooperate with a complementary threaded stud, not shown. The nut 40 is provided with a clamping surface 42 and an annular depending protuberance 44 which are identical to the clamping surface 14 and protuberance 20 shown in Figs. 3 through 6 inclusive. The washer 46 is provided with an annular concavo-convex body 48 which is similar to the above described annular body 26 of the washer 10. Locking prongs 50 extend radially outwardly from the body 48 and are twisted or deflected in the same manner as the locking teeth 28 described above. In order to retain the nut 40 and washer 46 in assembled relationship, an annular groove 52 is provided in the clamping surface 42 of the nut 40. A frusto-conical attachment portion 54 extends inwardly from the concavo-convex portion 48 of the washer 46 and into the annular groove 52. The annular flange or skirt 56 on the nut 40 is then deformed radially outwardly to the position shown in Fig. 7 to hold the washer 46 in assembled relationship with the nut. Operation of the device shown in Fig. 7 is identical to that of the embodiments shown in Figs. 1 through 6, inclusive.

In Fig. 8, another embodiment of this invention is shown. In this embodiment, a washer 60 is shown applied to a screw having a pan head 62 and a shank having a threaded portion 64 and a smooth section 66 of lesser diameter than the outer diameter of the threads. The head 62 of the screw has a work facing or clamping surface 68 extending radially outwardly from the shank. An annular protuberance 70 extends axially of the screw from the surface 68. The annular protuberance 70 is similar to the above described protuberance 20, except that it is located adjacent the outer periperal edge of the surface 68, and, if desired, the outer terminal edge of the protuberance 70 may be slightly rounded as shown.

The washer 60 comprises a concavo-convex annular body section 72 similar to the body section 26 of the above described washer 10, and a plurality of radially extending axially twisted locking teeth 74 similar to the locking teeth described above. However, as shown in Fig. 8, the locking teeth 74 extend inwardly from the body section instead of outwardly as in the previously described washers. The washer 60 is retained in preassembled relationship with the screw by the engagement of the teeth 74 with the upper convolution of the threads 64. The principle of operation of the embodiment of Fig. 8 is the same as the devices of Figs. 1 to 7.

From the above description, it is seen that the present invention provides a simple rotary fastener unit, having a deflected tooth type lock washer, wherein by the application of pressure to a relatively narrow annular area, an effective seal is obtained between the washer and the work, and between the washer and the screw or nut. Furthermore, effective locking action of the washer is assured by preventing the complete collapsing of the prongs, and the device is simplified by utilizing the same means to apply the sealing pressure and to prevent complete flattening of the prongs.

While the preferred embodiments of my device have been shown and described herein, it is understood that various changes may be made in the preferred structure without departing from the spirit and scope of the appendant claims.

I claim:
1. A rotary fastener unit comprising a rotary threaded clamping member having a generally radially extending clamping surface, a lock washer adjacent said clamping surface, and means for retaining the clamping member and the lock washer in preassembled relationship, said lock washer having an annular body which is of generally concavo-convex radial cross section with its concave side facing said clamping surface and presenting on its convex side an annular surface of limited radial extent at the trough of said cross section as a sealing surface, said lock washer having locking elements extending radially from said annular body, said locking elements being deflected to present tooth edges axially beyond bounding planes of said annular body, said clamping member including an annular V-shaped protuberance means extending axially from said clamping surface and presenting a continuous annular edge axially aligned with and concentric to the annular sealing surface of the lock washer for engaging the concave side of the annular body to clamp the opposite sealing surface thereof into sealing contact with a workpiece, said protuberance means simultaneously serving as an abutment to prevent complete flattening of the washer teeth when the washer is clamped between said clamping surface of the clamping member and a workpiece.

2. A rotary fastener unit, as defined in claim 1, wherein said locking elements project radially outwardly from an outer margin of said annular washer body.

3. A rotary fastener unit, as defined in claim 1, wherein said locking elements project radially inwardly from an inner margin of said annular washer body.

4. A rotary fastener unit, as defined in claim 1, wherein said clamping member comprises a screw having a shank extending axially from said clamping surface, and wherein said means for retaining the clamping element and said lock washer in assembled relationship comprises means projecting from said shank and underlying said washer.

5. A rotary fastener unit, as defined in claim 1, wherein said clamping member comprises a nut having an annular recess in said clamping surface, and said washer body includes a frusto-conical section extending into said recess, said recess being partially defined by a radially flared wall underlying said frusto-conical section for retaining the washer and clamping member in preassembled relationship.

References Cited in the file of this patent

UNITED STATES PATENTS

| | | |
|---|---|---|
| 1,955,924 | MacLean | Apr. 24, 1934 |
| 1,969,796 | Hoke | Aug. 14, 1934 |
| 2,225,654 | Olson | Dec. 24, 1940 |
| 2,227,464 | Olson | Jan. 7, 1941 |
| 2,557,288 | Hosking | June 19, 1951 |
| 2,576,906 | Poupitch | Nov. 27, 1951 |